Aug. 17, 1954  A. C. BUNKER  2,686,575
BRAKE RIGGING FOR RAILWAY VEHICLES
Filed May 13, 1952  2 Sheets-Sheet 1
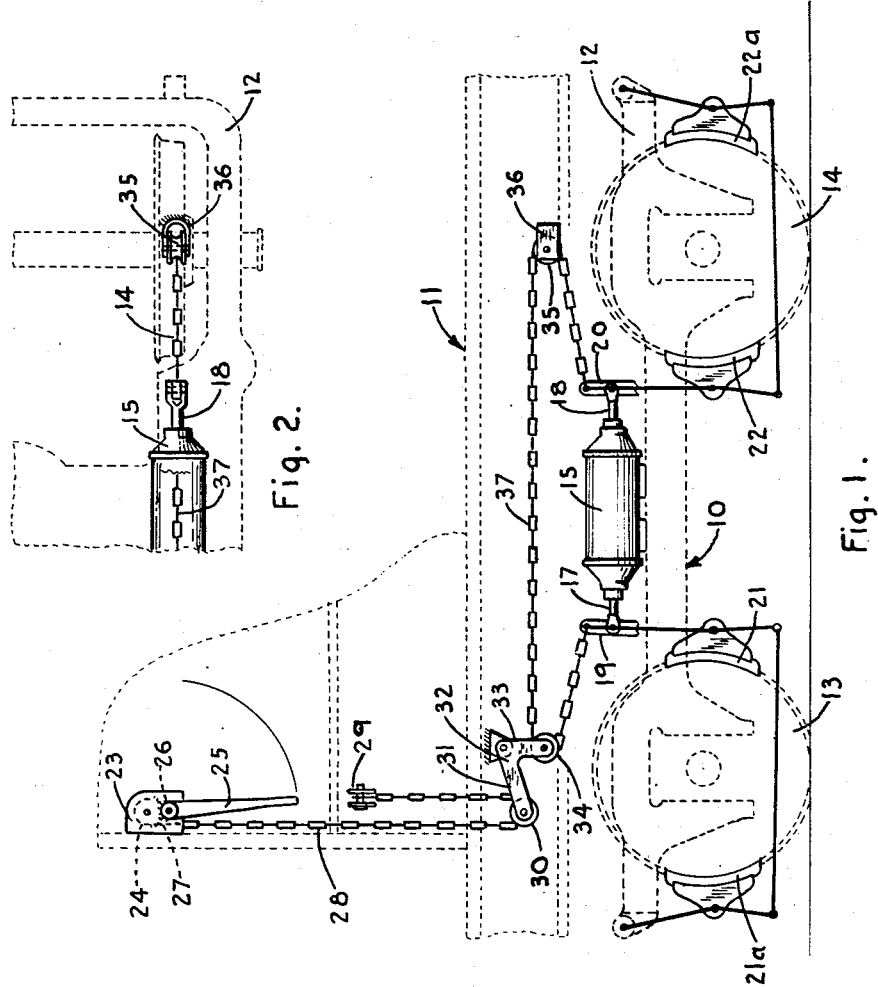
ARTHUR C. BUNKER
INVENTOR
BY *Maurice W. Grady*
ATTORNEY Aug. 17, 1954  A. C. BUNKER  2,686,575
BRAKE RIGGING FOR RAILWAY VEHICLES
Filed May 13, 1952  2 Sheets-Sheet 2
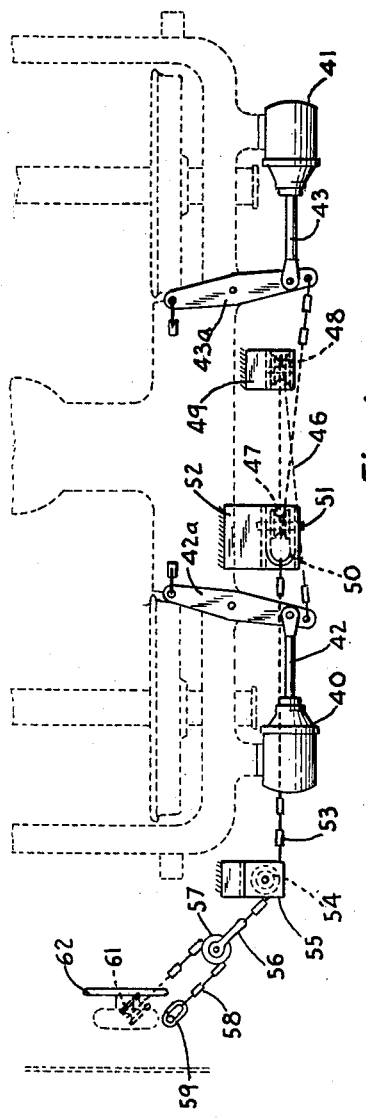
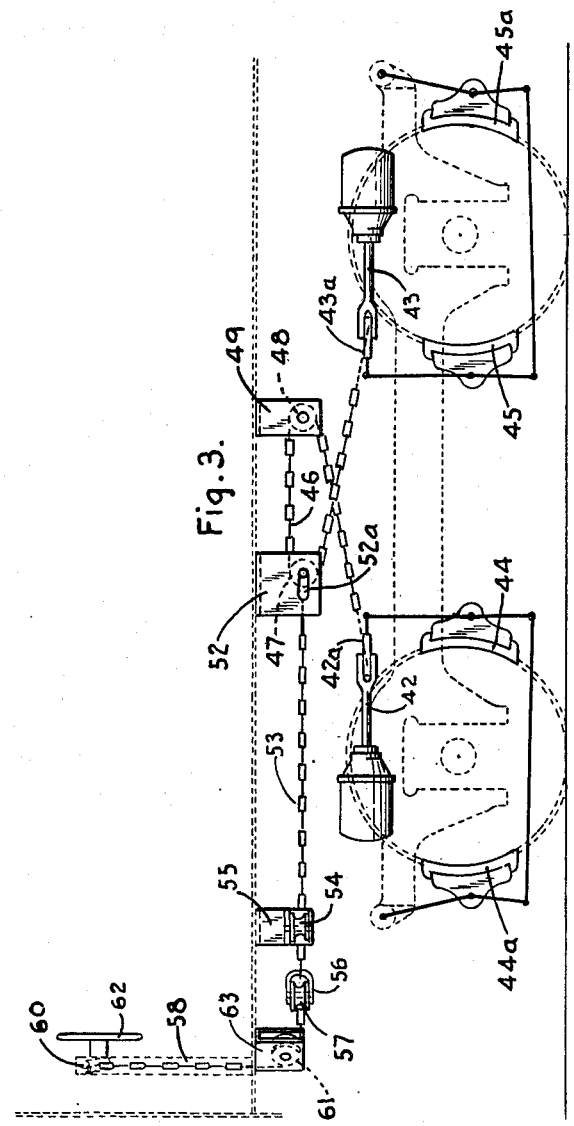
ARTHUR C. BUNKER
INVENTOR
BY Maurice W. Grady
ATTORNEY Patented Aug. 17, 1954

2,686,575

UNITED STATES PATENT OFFICE 2,686,575

BRAKE RIGGING FOR RAILWAY VEHICLES

Arthur C. Bunker, Schenectady, N. Y., assignor to American Locomotive Company, New York, N. Y., a corporation of New York Application May 13, 1952, Serial No. 287,543

6 Claims. (Cl. 188—107)

This invention relates to brake rigging for a railway vehicle, and particularly to hand brake apparatus adapted to supplement the power brakes of the unit cylinder type which conventionally form part of a well known class of such brake rigging.

It is a requirement that all locomotives other than steam be provided with manually operative equipment to brake the locomotive trucks when, for any reason, the power brake system becomes inoperative. Conventional hand braking apparatus has served to brake only one wheel, that is to say one axle of a railway vehicle, but such an arrangement has proved inadequate.

The main object of this invention is to provide hand braking apparatus for the brake rigging of a railway vehicle which will function to brake two wheels, that is to say two axles, of a railway vehicle truck. A further object is to provide a simplified construction of hand brakes employing chains rather than levers thereby reducing friction losses. A further object is to provide such hand brake apparatus which can be adapted for use with both twin piston and single piston brake cylinders. Other and further objects of the present invention will be apparent from the following description, the accompanying drawings, and the appended claims.

Referring to the drawings:

Fig. 1 is a partial side view in elevation, partly in diagrammatic form, of a railway vehicle showing an embodiment of the invention in connection with twin piston brake cylinders.

Fig. 2 is a partial plan view of Fig. 1.

Fig. 3 is a similar view to Fig. 1 but showing the embodiment of the invention in connection with the single piston type of brake cylinders.

Fig. 4 is a partial plan view of Fig. 3.

In Figs. 1 and 2, a railway vehicle truck, generally indicated by the reference numeral 10, supports a vehicle superstructure, generally indicated by the numeral 11. Mounted on each of the two side frame members 12 of the truck and in longitudinal alignment with the treads of the wheels 13 and 14 is a power cylinder 15 containing opposed pistons (not shown), the outer ends of which are connected to push rods 17 and 18. Rods 17 and 18 are moved outwardly away from each other as the pistons are forced apart by compressed air admitted by conventional means to the brake cylinder. The outward movement of the push rods actuates levers 19 and 20 respectively (shown fragmentally and diagrammatically) to move brake shoes 21 and 22 into engagement with their respective wheels. Shoes 21a and 22a are also brought into braking engagement with their respective wheels through the conventional linkage shown. The apparatus thus far described is well known and is not claimed per se as the subject matter of the invention herein.

Suitably secured at a convenient place on the superstructure, such as the rear wall of the vehicle cab, is a housing 23 in which is arranged a winding drum 24. A hand lever 25 is fulcrumed in the housing and carries a pinion 26 which meshes with a gear 27 on the drum. When an operator manually moves lever 25 counterclockwise, as viewed in Fig. 1, drum 24 is rotated clockwise to wind up the length of chain 28, the latter being secured at one end to the drum 24 and at its other end to anchoring means on the superstructure, indicated at 29. Between its ends, chain 28 passes over a sheave 30, the axle of which is fixedly mounted in the outer end of the longer arm 31 of a bell crank 32 pivotally secured to the superstructure. The shorter arm 33 of the bell crank also carries a sheave 34 which is freely rotatable therein. A third sheave 35 is journalled in a bracket 36 which is fixedly mounted on the underframe (see Fig. 2). A length of chain 37 passes over sheaves 34 and 35 and has its ends secured to levers 19 and 20. As sheave 30 is moved upwardly, as viewed in Fig. 1, in response to the manual operation of hand lever 25, bell crank 32 is actuated to move sheave 34 to the left alongside the underframe. Since sheave 35 is mounted in a fixed bracket 36, it is obvious that the movement of sheave 34 alongside the underframe will pull the ends of the length of chain 37 away from each other and that levers 19 and 20 will be drawn apart to pull rods 17 and 18 outwardly away from each other. If, then, the power cylinder 15 should for any reason fail to operate, resort can be had to the hand lever and the levers 19 and 20 will function to actuate the brake linkages of which they respectively form a part to actuate the corresponding pairs of brake shoes to force them into braking position against their wheels in the manner normally effected by the push rods 17 and 18.

It will be apparent from an inspection of the drawing that a considerable mechanical advantage is achieved when hand lever 25 is operated to lift sheave 30 by means of chain 28. A further mechanical advantage obviously results through the functioning of bell crank 32 when sheave 30 is lifted to actuate sheave 34.

Referring now to Figs. 3 and 4, another embodiment of the invention is illustrated as applied to a truck in which the power brakes for each wheel are actuated by individual brake cylinder assemblies. Cylinders 40 and 41 normally function individually to provide power means to move rods 42 and 43 respectively toward each other to actuate their associated conventional linkages to operate the pairs of brake shoes 44 and 44a and 45 and 45a. The apparatus of this embodiment of the invention may be operated manually to move such rods, and hence the linkages and brake shoes, whenever the power means become inoperative.

The length of chain 46 has its opposite ends secured to levers 42a and 43a and is arranged in cross-over relation to pass over sheaves 47 and 48, as best seen in Fig. 3. Sheave 48 is journalled in bracket 49 which is fixedly attached to the vehicle underframe. Sheave 47 is journalled in a U-shaped support 50, the latter being provided with laterally extending studs 51 which are slidable in slots 52a formed in the side walls of a bracket 52 fixedly attached to the vehicle underframe. A second length of chain 53 is secured at one end to support 50 and passes over a guide sheave 54 mounted on bracket 55 secured to the underframe. Chain 53 is secured at its other end to the U-shaped support 56 in which is journalled a sheave 57. A third length of chain 58, anchored at one end 59 to the vehicle superstructure, passes over sheave 57 and sheave 61 which is journalled in bracket 63, to a winding drum 60 which is rotatable manually by an operator.

The operation of the system of chains and sheaves of this embodiment is simple. On the manual operation of drum 60 by a conventional handwheel 62 (see Fig. 4), chain 58 is wound on to the drum to draw sheave 57 toward the drum. Support 56, in which sheave 57 is mounted, is likewise drawn toward the drum and will pull chain 53 over guide sheave 54 to move sheave 47 in a fixed path to the left along the slots 52a, as seen in Fig. 3. Since the axle of sheave 48 is fixed, the movement of sheave 47 will actuate chain 46 to pull levers 42a and 43a toward each other thus causing the linkages associated therewith to brake the shoes 44, 44a, 45, and 45a against their respective wheels.

While there have been hereinbefore described approved embodiments of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. Hand brake apparatus to actuate the brake rigging of two adjacent wheel and axle assemblies of a locomotive truck, such brake rigging being of the class which includes a pair of brake shoes for each wheel of said two wheel and axle assemblies, each pair of shoes being independently actuated by a linkage means actuated by individual power cylinders, said apparatus comprising a portion of the locomotive underframe, a sheave rotatable on an axle mounted in the underframe portion, a second sheave rotatable on an axle movable in relation to the underframe portion, a length of cable passing over said sheaves and having its opposite ends adapted for connection to separate brake linkage means on one side of the truck, and manually operable means connected to the second sheave to move the latter alongside the underframe portion to increase the distance between the sheave axles thereby to move the cable ends to actuate the linkage means connected therewith, thus drawing the respective pairs of brake shoes into braking position.

2. Hand brake apparatus of the character described comprising a portion of the locomotive underframe, a sheave rotatable on an axle fixedly mounted in the underframe portion, a second sheave rotatable on an axle movable alongside the underframe portion, a length of cable passing over said sheaves and having its opposite ends adapted for connection to separate brake linkage means on one side of the truck, a third sheave rotatable upon an axle movable alongside the underframe portion, means connecting the axles of said second and third sheaves, and manually operable means to move the third sheave alongside the underframe portion thus moving the second sheave to increase its distance from the first sheave thereby actuating the cable ends to operate the linkages connected thereto to draw the associated pairs of brake shoes into braking position.

3. Hand brake apparatus of the class described comprising a portion of the locomotive underframe, a sheave rotatable on an axle fixedly mounted on the underframe portion, a second sheave rotatable on an axle movable alongside the underframe portion, a length of cable passing over said sheaves and having its ends crossed over for connection to separate brake linkage means on one side of the truck, and manually operable means connected to the second sheave to increase the distance between the sheaves thereby to move the cable ends to pull the associated linkage means toward each other thus drawing the respective pairs of brake shoes into braking relation.

4. Hand brake apparatus of the class described comprising a portion of the locomotive underframe, a sheave rotatable on an axle fixedly mounted on the underframe portion, a second sheave rotatable on an axle movable alongside the underframe portion, a first length of cable passing over said sheaves and having its ends adapted for connection to separate brake linkage means on one side of the truck, a bell crank lever pivotally mounted on the underframe portion, one of the arms of the bell crank being connected to the axle of the second sheave, a third sheave carried by the other arm of the bell crank lever, a second length of cable passing over the third sheave and having one end anchored to the underframe portion, a rotatable drum having the other end of the second cable length secured thereto for winding thereon, and a hand lever pivoted to the underframe portion and in operative connection with the drum, the arrangement of the foregoing elements being such that the drum may be turned by the hand lever to wind the second length of cable thereon, thus moving the third sheave to pivot the bell crank to move the second sheave to cause the ends of the first length of cable to actuate the brake linkages.

5. Hand brake apparatus of the character described comprising a portion of the locomotive underframe, a sheave rotatable on an axle fixedly mounted on the underframe portion, a second sheave rotatable on an axle movable in a fixed path, a first length of cable passing over said sheaves and having its ends crossed over for connection to separate brake linkage means on one side of the truck, a second length of cable, one end of which is connected to the axle of the second sheave, and manually operable means to pull said second length of cable to move the second sheave along its fixed path away from the first sheave thereby to move the ends of the first length of cable toward each other to operate the brake linkage means connected thereto.

6. Hand brake apparatus of the character described comprising a portion of the locomotive underframe, a sheave rotatable on an axle fixedly mounted on the underframe portion, a second sheave rotatable on an axle movable alongside the underframe portion, a first length of cable passing over said sheaves and having its ends adapted for connection to separate brake linkage means on one side of the truck, a bell crank lever pivotally mounted on the underframe portion, said lever having arms of unequal length, means on the shorter of said arms in which the axle of the second sheave is journalled, a third sheave journalled in the longer arm of said lever, a second length of cable having one end anchored to the vehicle superstructure and passing over the third sheave, and manually operable means secured to the other end of the second length of cable, the arrangement of the elements being such that said last means is movable to move the second length of cable to pivot the bell crank to move the second sheave to draw the ends of the first length of cable away from each other thus to operate the brake linkages.

References Cited in the file of this patent

UNITED STATES PATENTS

| Number | Name | Date |
|---|---|---|
| 536,380 | Guy | Mar. 26, 1895 |
| 851,874 | Fero, Jr. | Apr. 30, 1907 |
| 1,752,704 | Sleeman | Apr. 1, 1930 |
| 2,391,664 | White | Dec. 25, 1945 |